(12) United States Patent
Brown, III

(10) Patent No.: US 7,338,030 B2
(45) Date of Patent: Mar. 4, 2008

(54) QUICK STOP SUPPLY VALVE

(76) Inventor: Chester O Brown, III, 1315 Clay Ave., Panama City, FL (US) 32401

(*) Notice: Subject to any disclaimer, the term of this patent is extended or adjusted under 35 U.S.C. 154(b) by 77 days.

(21) Appl. No.: 11/154,571

(22) Filed: Jun. 17, 2005

(65) Prior Publication Data

US 2006/0284133 A1    Dec. 21, 2006

(51) Int. Cl.
*F16K 51/00*  (2006.01)
*F16L 29/00*  (2006.01)

(52) U.S. Cl. ........................ 251/148; 285/321

(58) Field of Classification Search ............... 251/148, 251/151; 285/39, 319, 321
See application file for complete search history.

(56) References Cited

U.S. PATENT DOCUMENTS

| | | | |
|---|---|---|---|
| 3,126,194 A | 3/1964 | Franck | |
| 4,335,747 A | 6/1982 | Mitsumoto et al. | |
| 4,911,406 A | 3/1990 | Attwood | |
| 4,919,457 A * | 4/1990 | Moretti | 285/39 |
| 5,110,157 A | 5/1992 | Chen | |
| 5,374,088 A | 12/1994 | Moretti et al. | |
| 5,378,024 A * | 1/1995 | Kumagai et al. | 285/39 |
| 6,378,912 B1 * | 4/2002 | Condon et al. | 285/220 |
| 6,685,162 B2 | 2/2004 | Carpenter | |

OTHER PUBLICATIONS

The Tectite Push-Fit System, Tectite Data Book—Sep. 2003.

* cited by examiner

*Primary Examiner*—John Rivell
*Assistant Examiner*—John K. Fristoe, Jr.
(74) *Attorney, Agent, or Firm*—Crowell & Moring LLP

(57) ABSTRACT

A supply valve with a valve housing having a fluid inlet and a fluid outlet; a control element which selectively turns the flow of liquid on and off; and a pipe joining assembly. The fluid inlet has a sequentially stepped inner cylindrical surface made up of a first portion having a first diameter at the distal end of the fluid inlet and terminating in a first shoulder, a second portion having a second diameter smaller than the first diameter extending from the first shoulder to a second shoulder, and a third portion having a third diameter smaller than the second diameter extending from the second shoulder to a third shoulder. The pipe joining assembly includes an O-ring seal, a protection ring, a lock ring, a release ring, and a cartridge ring having a predetermined thickness. The release ring, the lock ring, and the protection ring are mounted in the cartridge ring to form a cartridge ring assembly; the cartridge ring assembly is disposed in the first portion which extends axially for a distance substantially equal to the thickness of the cartridge ring when the cartridge ring assembly is mounted in the first portion; the O-ring seal is disposed in the second portion; the cartridge ring assembly and the O-ring seal have an inner diameter substantially equal to the third diameter; and the third diameter is substantially equal to the outer diameter of a pipe to be inserted into the inlet with a press fit.

8 Claims, 3 Drawing Sheets

QUICK STOP SUPPLY VALVE

BACKGROUND AND SUMMARY OF THE INVENTION

This invention relates to valves and, more particularly, this invention relates to supply valves.

Supply valves are well-known and used in both industrial and domestic settings to supply the flow of water to, for example, sinks, toilets, and the like. Typically, the valve chosen is determined by the nature of the pipe to which the valve will be attached. For instance, copper tube may be attached to a valve using compression fittings. Compression fittings require a compression nut and a compression ring or ferrule which are to be mated with a compression seat of a valve housing. Copper pipe may require a valve suitable for soldering or brazing. Plastic pipe may require a valve specially constructed to accept plastic pipe. Some plastics require the use of a special cement or solvent. Thus, the installer must be prepared to install all types of pipe or tubing and valves to match. The installation in each case is time consuming and, at times, difficult. Consequently, there exists a need for a universal supply valve that can be used with any type of pipe.

It is, therefore, an object of the present invention to provide a valve which is free of the aforementioned and other such disadvantages.

It is another object of the present invention to provide a valve which can be used with any type of approved pipe.

It is still another object of the present invention to provide a valve to which any type of approved pipe can be easily attached without heat or cement.

Consistent with the foregoing objects, the supply valve of the present invention comprises a valve housing having a fluid inlet which comprises a sequentially stepped inner cylindrical surface comprising a first portion having a first diameter at the distal or inner end of the fluid inlet and terminating in a first shoulder, a second portion having a second diameter smaller than the first diameter extending from the first shoulder to a second shoulder, and a third portion having a third diameter smaller than the second diameter extending from the second shoulder to a third shoulder; and a fluid outlet; a control element which selectively turns the flow of liquid on and off; and a pipe joining assembly, the pipe joining assembly comprising an O-ring seal, a protection ring, a lock ring, a release ring, and a cartridge ring having a predetermined thickness;

wherein:

(A) the release ring, the lock ring, and the protection ring are mounted in the cartridge ring to form a cartridge ring assembly;

(B) the cartridge ring assembly is disposed in said first portion which extends axially for a distance substantially equal to the thickness of the cartridge ring when the cartridge ring assembly is mounted in the first portion;

(C) the O-ring seal is disposed in the second portion;

(D) the cartridge ring assembly and the O-ring seal have an inner diameter substantially equal to the third diameter; and (E) the third diameter is substantially equal to the outer diameter of a pipe to be inserted into the inlet with a press fit.

It is to be understood that the word "pipe" as used herein is meant to include metal or plastic conduit or pipe as well as metal or plastic tubing which may be used to supply water or the like to a fixture such as a sink, toilet, ice-maker, etc. Pipes may be made of copper, stainless steel, PVC (polyvinyl chloride), CPVC (chlorinated polyvinyl chloride), poly (polybutylene), PEX (cross-linked polyethylene) or any other type of pipe used for plumbing purposes Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
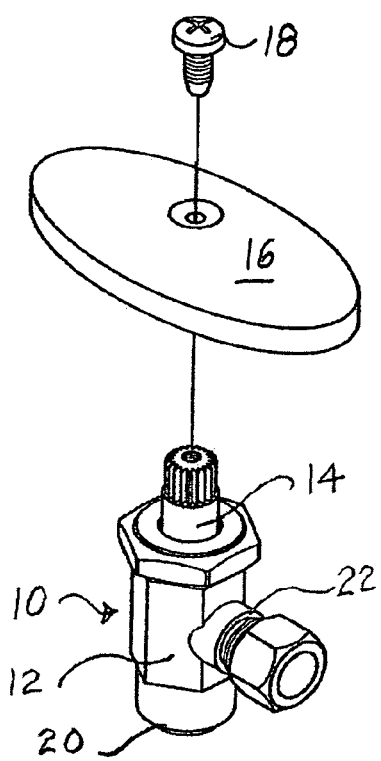
FIG. 1 is a perspective view of an angle supply valve.

FIG. 1 shows an angle supply valve generally indicated by the numeral 10. Supply valve 10 includes a housing 12 which is typically made of brass but can be made of any suitable material known in the art. A conventional stem 14 is disposed within the housing 10 to control the flow of water through the valve. A handle 16 is attached to the stem 14 by conventional means such as a screw 18. Water enters through fluid inlet 20 and exits through an outlet 22.

Figure 2:
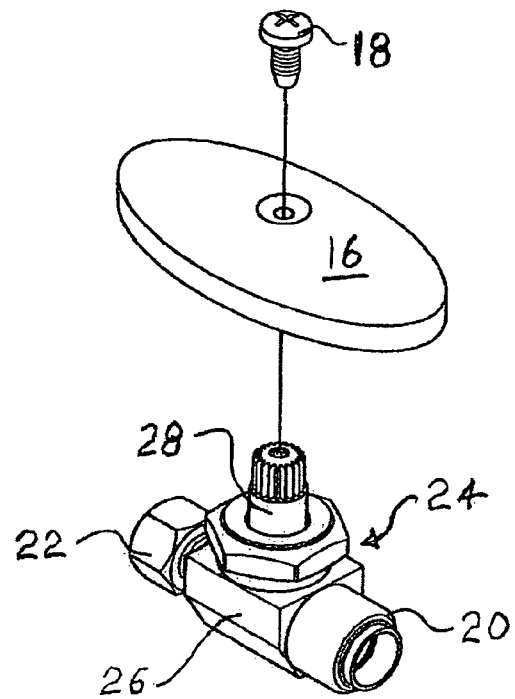
FIG. 2 is a perspective view of a straight supply valve.

FIG. 2 shows a straight supply valve generally indicated by the numeral 24. Supply valve 24 includes a housing 26 which is typically made of brass but can be made of any suitable material known in the art. A conventional stem 28 is disposed within the housing 24 to control the flow of water through the valve. A handle 16 is attached to the stem 28 by conventional means such as a screw 18. Water enters through fluid inlet 20 and exits through an outlet 22.

Figure 4:
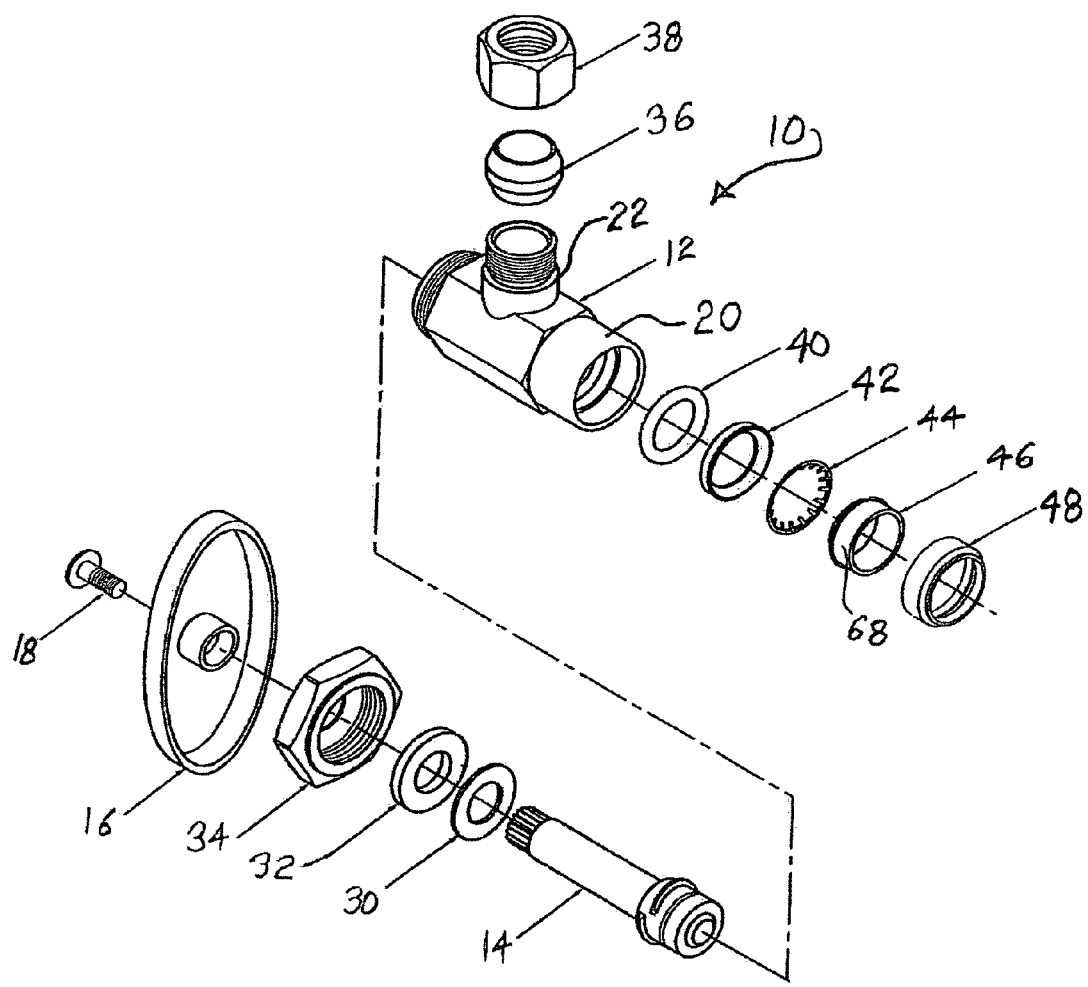
FIG. 4 is an exploded view of an angle supply valve according to the present invention.

Turning now to FIG. 4, valve comprises housing 12, conventional stem 14, a brass packing washer 30, a rubber packing washer 32, a brass packing nut 34, and handle 16 attached to the stem 14 by a screw 18. The material of which the packing washers and packing nut are made, as just described, is preferred but they can be fabricated of any suitable material which is well-known in the art.

The outlet 22 is shown with a brass ferrule 36 and brass compression nut 38 which would be used to affix brass, copper, or the like tubing to the valve. Of course, if some other type of tubing or pipe is to be affixed to the outlet of the valve, a suitable well-known connection would be used.

At the inlet end 20 of the housing 12 there are, in order, an O-ring seal 40, a protection ring 42, a lock ring 44, a release ring 46, and a cartridge ring 48. The protection ring 42, release ring 46, and cartridge ring 48 are each fabricated of a suitable plastic which is well-known in the art. Known plastics which may be used depending on the environment are nylon, acetal, Teflon® (polytetrafluoroethylene), and the like. The lock ring 44 is preferably made of stainless steel.

Figure 5:
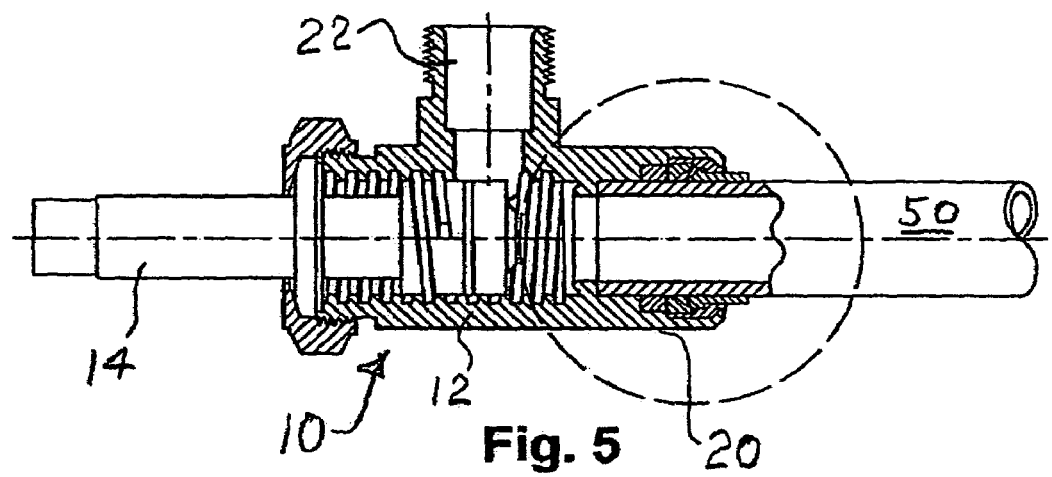
FIG. 5 is an elevational view in cross-section of the valve of FIG. 4.

FIG. 5 shows a pipe 50 inserted in the fluid inlet 20 of the housing 12. The construction of the inlet can be better appreciated from FIG. 6. There it will be seen that the fluid inlet 20 comprises a sequentially stepped inner cylindrical surface comprising a first portion 52 having a first diameter at the distal end of the fluid inlet 20 and terminating in a first shoulder 54, a second portion 56 having a second diameter smaller than the first diameter extending from the first shoulder 54 to a second shoulder 58, and a third portion 60 having a third diameter smaller than the second diameter extending from the second shoulder 58 to a third shoulder 62.

O-ring 40 is disposed in the second portion 56 against second shoulder 58. The axial length of the second portion 56 is approximately equal to the thickness of the O-ring when it is in place and partially compressed by pipe 50. Protection ring 42, lock ring 44, and release ring 46 are assembled in cartridge ring 48 to form a cartridge ring assembly 64 and the cartridge ring assembly 64 is disposed in the first portion 52 against first shoulder 54. The cartridge ring assembly 64 locks in place against axial movement due to abutting against the first shoulder 54 at the proximal end of first portion 52 and the press-fit at the distal end 66. Annular extension 68 of release ring 46 extends out of fluid inlet 20 at the distal end.

Figure 6:
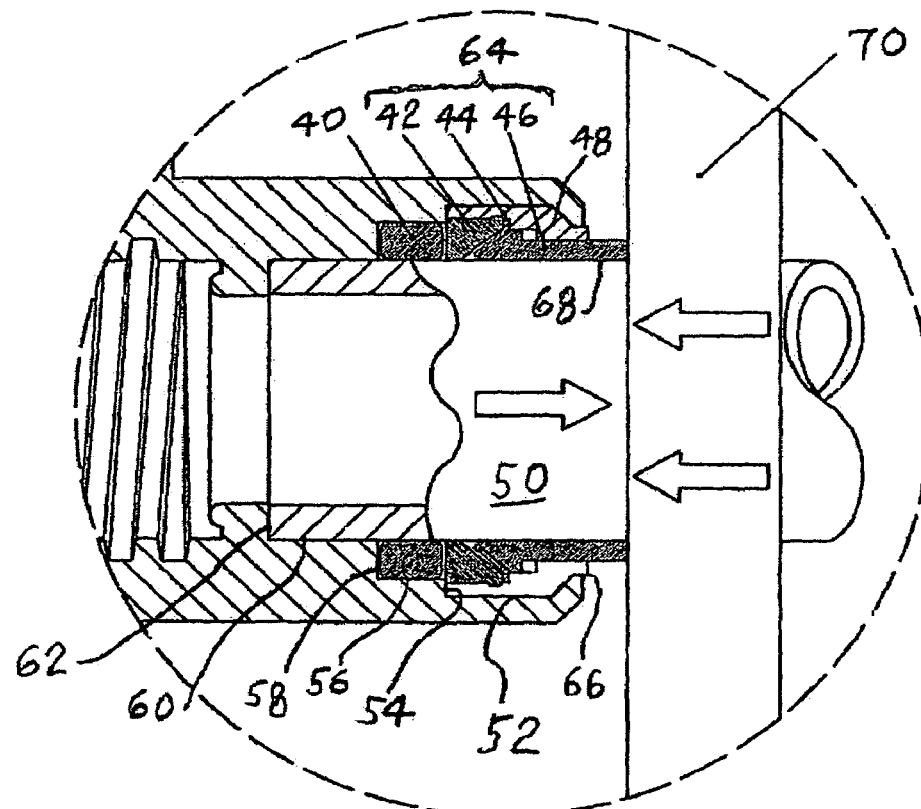
FIG. 6 is an enlarged cross-sectional view of the inlet of the valve of FIG. 5.

As can be seen in FIGS. 5 and 6, pipe 50 is inserted into fluid inlet 20 creating a snug fit against release ring 46, protection ring 42, and O-ring 40, then extending into third portion 60 and abutting third shoulder 62. The radial dimension of third shoulder 62 is substantially the same as the thickness of the wall of pipe 50, thereby minimizing, if not eliminating, turbulence which might be caused by an obstruction in the flow of fluid.

Figure 3:
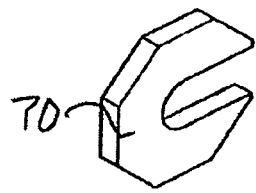
FIG. 3 is a perspective view of a tool for assisting in removing the release ring from the assembly.

As mentioned earlier, the cartridge ring assembly 64 is locked in place. If it is necessary to remove the assembly at some time, the tool 70 which is shown in FIG. 3 is placed over annular extension 68 of release ring 46 to compress it, thereby allowing for removal of the assembly, as shown in FIG. 6.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A supply valve comprising a valve housing having a fluid inlet which comprises a sequentially stepped inner cylindrical surface comprising a first portion having a first diameter at the distal end of said fluid inlet and terminating in a first shoulder, a second portion having a second diameter smaller than the first diameter extending from the first shoulder to a second shoulder, and a third portion having a third diameter smaller than the second diameter extending from the second shoulder to a third shoulder; and a fluid outlet; a control element which selectively turns the flow of liquid on and off; and a pipe joining assembly, said pipe joining assembly comprising an O-ring seal, a protection ring, a lock ring, a release ring, and a cartridge ring having a predetermined thickness;

wherein:
   (A) the release ring, the lock ring, and the protection ring are mounted in the cartridge ring to form a cartridge ring assembly;
   (B) the cartridge ring assembly is disposed in said first portion and has an axial extent delimited at one end by a plane of the first shoulder when the cartridge ring assembly is mounted in said first portion;
   (C) said O-ring seal is disposed in said second portion;
   (D) said cartridge ring assembly and said O-ring seal having an inner diameter substantially equal to said third diameter; and
   (E) said third diameter is substantially equal to the outer diameter of a pipe to be inserted into said inlet with a press fit.

2. A supply valve as defined in claim 1, wherein said protection ring, release ring, and cartridge ring each is fabricated of a plastic.

3. A supply valve as defined in claim 1, wherein said lock ring is fabricated of stainless steel.

4. A supply valve as defined in claim 1, wherein said protection ring, release ring, and cartridge ring each comprises a plastic; said lock ring comprises stainless steel; and said O-ring comprises rubber.

5. A supply valve as defined in claim 1, wherein said release ring extends axially outwardly from the distal end of said inlet.

6. In combination, a supply valve as defined in claim 1 and a pipe inserted through said cartridge assembly, said O-ring, and said third portion to seat against said third shoulder.

7. The combination as defined in claim 6, wherein the pipe is metal or plastic.

8. The combination as defined in claim 7, wherein the pipe comprises copper, stainless steel, PVC, CPVC, poly, or PEX.

* * * * *